UNITED STATES PATENT OFFICE.

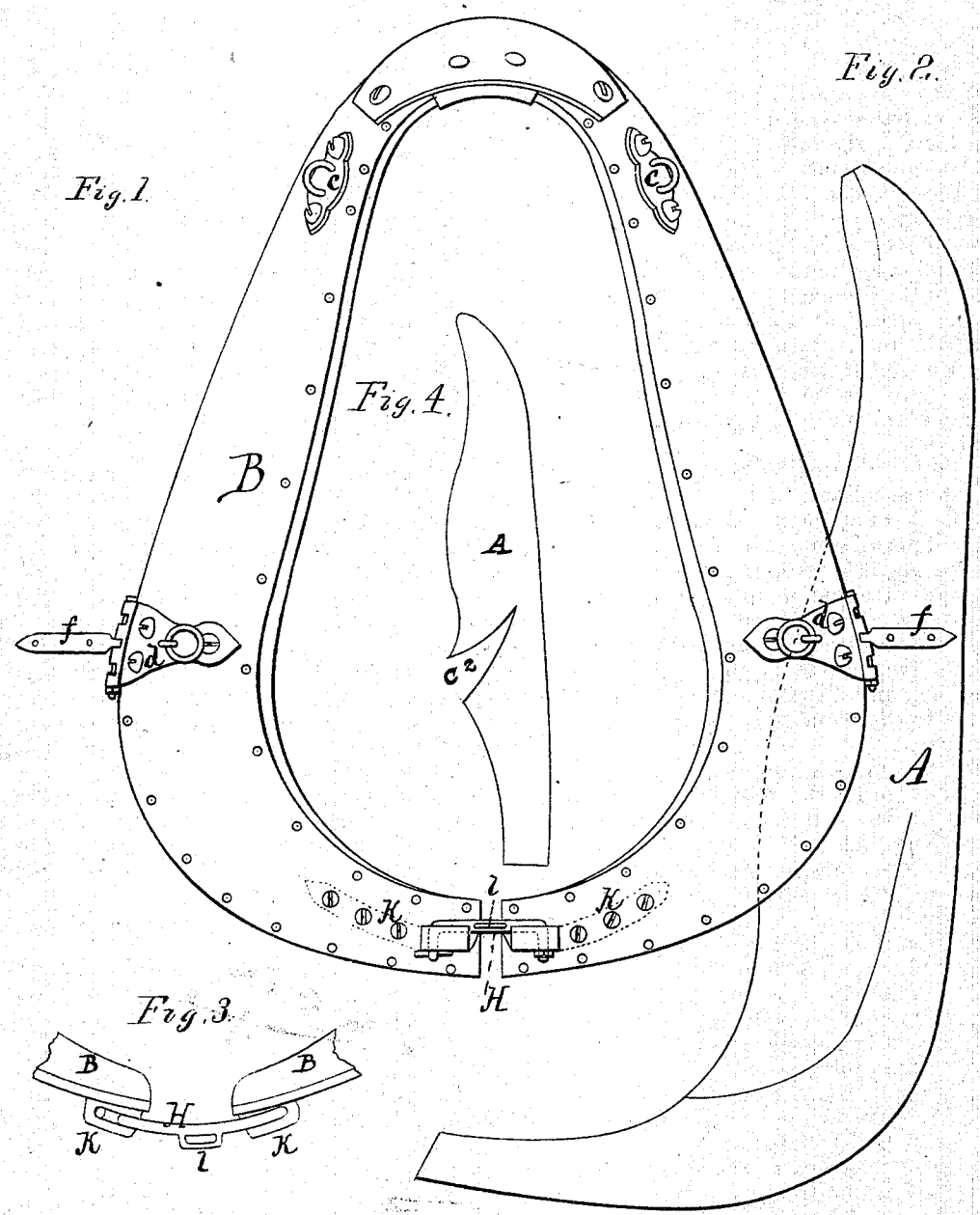

JOHN N. SCHMITZ, OF KILBOURN CITY, WISCONSIN.

IMPROVEMENT IN HORSE-COLLARS.

Specification forming part of Letters Patent No. 139,822, dated June 10, 1873; application filed March 1, 1873.

*To all whom it may concern:*

Be it known that I, JOHN N. SCHMITZ, of Kilbourn City, in the county of Columbia and State of Wisconsin, have invented a new and valuable Improvement in Horse-Collars; and I do hereby declare that the following is a full, clear, and exact description of the construction and operation of the same, reference being had to the annexed drawings making a part of this specification, and to the letters and figures of reference marked thereon.

Figure 1 of the drawings is a representation of a top view of my horse-collar. Fig. 2 is a view of my blank or former. Figs. 3 and 4 are detail views.

My invention relates to certain improvements in horse-collars; and it consists in a wooden blank of peculiar shape, and constructed in a peculiar manner. The invention consists further in a fastening device so constructed and arranged as to allow the collar to be increased or diminished in size so as to fit different animals, and, when on the animal, to allow the two halves of the collar to partake of a back and forward motion, adjusting themselves to the shoulders when the animal is in motion.

In the drawing, A represents a wooden blank, which forms the foundation for one side or half of the collar. It is made from a bar of wood, which is first cut the desired length and then rounded to the proper form for the shoulder and belly of the collar. A triangular piece of the form shown in Fig. 4 is then sawed from the inner side, near the lower end, leaving a notch of the form shown at $c^2$, which notch is closed by steaming and bending the wood so as to form the blank shown in Fig. 2, which constitutes the foundation or filling for one side or half of the collar—the blank for the other half having the piece cut from the opposite side, and the wood bent in a direction opposite to that shown in Fig. 2, both bars being bent inward. Two of these blanks are used as the foundations or fillings for the two sides or halves of a collar, and are covered with leather by tacking it on, as shown, or by stitching it in the ordinary manner. The top of the collar may be closed, as shown, or may be arranged to fasten by means of buckles and straps, as may be preferred. B represents a collar made on my improved blanks, and covered and closed, as above described. Near the top, on either side, are the usual rein-rings $c$ $c$. Near the lower ends are the draft-plates $d$ $d$, with trace-clips $f f$ attached. The trace-clips have eyes on their outer ends which engage with eyes in the rear edges of the draft-plates, and are held by a pin or bolt after the manner of a hinge. There are several eyes on each of the draft-plates, and the trace-clips may be adjusted between any two of them, so as to raise or lower the draft. The fastening device consists of a bar, H, with its ends turned down so as to form hooks, midway between which is a loop, $l$, for the martingale. The hooked ends engage with holes in socket-plates K attached to the lower ends of the sides or halves of the collar, passing through to the lower edges of the plates, where they are held by nuts or keys.

There being a series of holes in each of the plates, the hooks may be inserted in any of them, so as to increase or diminish the size of the collar to fit different animals. By this mode of fastening the collar, the hooks working loosely in the sockets, the lower ends of the two halves of the collar are allowed a slight back and forward movement, so that when the collar is on the animal it adjusts itself to the shoulders when the animal is in motion, and distributes the pressure uniformly to all parts of the shoulders, instead of throwing it on them alternately.

What I claim as new, and desire to secure by Letters Patent, is—

1. In the construction of horse-collars the wooden blank A, having notch $c^2$ cut from its inner side near the lower end, and adapted to be closed when said blank is steamed and bent, in the manner shown and described.

2. The fastening device, consisting of the hooked-bar H, having the loop $l$ and socket-plates K provided with a series of holes, arranged and operating substantially as shown and described.

In testimony that I claim the above I have hereunto subscribed my name in the presence of two witnesses.

JOHN N. SCHMITZ.

Witnesses:
M. GRIFFIN,
JNO. W. BROWN.